United States Patent
Chan

(10) Patent No.: US 7,451,408 B2
(45) Date of Patent: Nov. 11, 2008

(54) SELECTING MOVING OBJECTS ON A SYSTEM

(75) Inventor: Sammy Chan, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 10/322,420

(22) Filed: Dec. 19, 2002

(65) Prior Publication Data
US 2004/0119744 A1    Jun. 24, 2004

(30) Foreign Application Priority Data
Dec. 19, 2001    (AU)    ................................... PR9630

(51) Int. Cl.
*G06F 3/00*    (2006.01)
*G06F 3/14*    (2006.01)
*G09F 7/00*    (2006.01)
(52) U.S. Cl. .................. 715/853; 715/864; 715/810
(58) Field of Classification Search ................ 715/792, 715/788, 815
See application file for complete search history.

(56) References Cited

U.S. PATENT DOCUMENTS

| 4,987,411 A | | 1/1991 | Ishigami ................ 340/709 |
| 5,236,199 A | * | 8/1993 | Thompson, Jr. ............ 463/41 |
| 5,786,818 A | | 7/1998 | Brewer et al. ............. 345/339 |
| 5,959,628 A | | 9/1999 | Cecchini et al. ........... 345/347 |
| 5,990,862 A | * | 11/1999 | Lewis ...................... 715/858 |
| 6,199,125 B1 | * | 3/2001 | Cortesi ..................... 710/67 |
| 6,362,842 B1 | | 3/2002 | Tahara et al. ............. 345/856 |
| 6,448,956 B1 | * | 9/2002 | Berman et al. ............ 345/156 |
| 6,731,316 B2 | * | 5/2004 | Herigstad et al. .......... 715/864 |

FOREIGN PATENT DOCUMENTS

EP    0 203 324 A2    12/1986
JP    11-212727    8/1999

OTHER PUBLICATIONS

Micheloni, C et al., Zoom on Target While Tracking, Sep. 2005, IEEE conference on Image processing 2005, All pages.*

* cited by examiner

*Primary Examiner*—William L Bashore
*Assistant Examiner*—Jordany Núñez
(74) *Attorney, Agent, or Firm*—Fitzpatrick, Cella, Harper & Scinto

(57) ABSTRACT

A method of selecting a GUI object (118) in a display space (402) using a user controlled pointing device (104) is disclosed. The method comprises the steps of establishing an initial range mapping between the pointing device and the display space, and defining an initial Selected Display Region (SDR) in the display space dependent on the initial range mapping. Then the method involves receiving (304), from the pointing device, a set of coordinates in the initial SDR, updating (306) the range mapping dependent upon the received set of coordinates, and redefining the SDR dependent upon the updated range mapping. The method then determines (308) the presence of any GUI object within the redefined SDR, and if a GUI object is present in the redefined SDR, selecting (310) the GUI object.

13 Claims, 10 Drawing Sheets

SELECTING MOVING OBJECTS ON A SYSTEM

TECHNICAL FIELD OF THE INVENTION

The present invention relates generally to selecting dynamically moving objects represented on a display screen and, in particular, to performing this selection using a remote control device. The present invention relates to a method and apparatus for selecting a dynamically moving object represented on a display screen. The invention also relates to a computer program product including a computer readable medium having recorded thereon a computer program for selecting a dynamically moving object represented on a display screen.

BACKGROUND ART

Display devices such as televisions (TVs) often display both static and dynamically moving graphical objects, as do display devices such as cathode ray tubes (CRTs) and Liquid Crystal Displays (LCDs) used with Personal Computers (PCs). These moving objects will be referred to in this description as Graphical User Interface (GUI) objects. The GUI objects of interest in this description are graphical elements such as icons or animated graphics that represent certain information to the user, and whose movements or positions on the display often change continuously in various directions or at various rates.

Common pointing devices used in PC systems include the mouse, trackball and joystick, and these are used to position a cursor at a desired position on the PC display screen. For example, the cursor may be positioned in such a manner as to define an insertion point at which text is to be incorporated into a document being displayed by a word processing application running on the PC. The pointing devices, and particularly the joystick, can also be used for dynamic applications such as PC based action games in which, for example, a representation of an aeroplane can thereby be guided about the display screen.

The aforementioned pointing devices typically have a range of operation that enables the cursor to be moved about the entire expanse of the display screen, and a constant relationship is typically maintained between an operating position of the pointing device and the corresponding location of the cursor on the display screen. In highly dynamic video applications, this arrangement, however, requires a high degree of sensory-motor coordination from the typical user, who is therefore unable to easily track a desired dynamically moving object on the screen.

SUMMARY OF THE INVENTION

According to one aspect of the invention, there is provided a method of selecting a GUI object in a display space using a user controlled pointing device, the method comprising the steps of:

(i) establishing an initial range mapping between the pointing device and the display space; (ii) defining an initial Selected Display Region (SDR) in the display space dependent on the initial range mapping; (iii) receiving, from the pointing device, a set of coordinates in the initial SDR; (iv) updating the range mapping dependent upon the received set of coordinates; (v) redefining the SDR dependent upon the updated range mapping; (vi) determining a presence of any GUI object within the redefined SDR; (vii) if one GUI object is present in the redefined SDR, selecting the GUI object; and (viii) if more than one GUI object is present in the redefined SDR, repeating steps (iii)-(viii).

According to another aspect of the invention, there is provided a method of selecting a GUI object in a display space using a pointing device, the method comprising the steps of:

(a) receiving a coordinate position from the pointing device; and (b) if a directional signal is received from the pointing device, selecting a closest GUI object in a direction dependent upon the directional signal.

According to another aspect of the invention, there is provided an apparatus for selecting a GUI object in a display space using a user controlled pointing device, the apparatus comprising:

(i) means for establishing an initial range mapping between the pointing device and the display space;

(ii) means for defining an initial Selected Display Region (SDR) in the display space dependent on the initial range mapping;

(iii) means for receiving, from the pointing device, a set of coordinates in the initial SDR;

(iv) means for updating the range mapping dependent upon the received set of coordinates;

(v) means for redefining the SDR dependent upon the updated range mapping;

(vi) means for determining a presence of any GUI object within the redefined SDR;

(vii) means for selecting, if one GUI object is present in the redefined SDR, the GUI object; and (viii) means for repeating, if more than one GUI object is present in the redefined SDR, steps (iii)-(viii).

According to another aspect of the invention there is provided an apparatus for selecting a GUI object in a display space using a pointing device, the apparatus comprising:

(a) means for receiving a coordinate position from the pointing device; and (b) means for selecting, if a directional signal is received from the pointing device, a closest GUI object in a direction dependent upon the directional signal.

According to another aspect of the invention there is provided a computer program for directing a processor to execute a procedure for selecting a GUI object in a display space using a user controlled pointing device, the program comprising:

(i) code for establishing an initial range mapping between the pointing device and the display space;

(ii) code for defining an initial Selected Display Region (SDR) in the display space dependent on the initial range mapping;

(iii) code for receiving, from the pointing device, a set of coordinates in the initial SDR;

(iv) code for updating the range mapping dependent upon the received set of coordinates;

(v) code for redefining the SDR dependent upon the updated range mapping;

(vi) code for determining a presence of any GUI object within the redefined SDR;

(vii) code for selecting, if one GUI object is present in the redefined SDR, the GUI object; and (viii) code for repeating, if more than one GUI object is present in the redefined SDR, steps (iii)-(viii).

According to another aspect of the invention there is provided a computer program for directing a processor to execute a procedure for selecting a GUI object in a display space using a pointing device, the program comprising:

(a) code for receiving a coordinate position from the pointing device; and (b) code for selecting, if a directional signal is received from the pointing device, a closest GUI object in a direction dependent upon the directional signal.

According to another aspect of the invention there is provided a computer program product including a computer readable medium having recorded thereon a computer program for directing a processor to execute a procedure for selecting a GUI object in a display space using a user controlled pointing device, the program comprising:

(i) code for establishing an initial range mapping between the pointing device and the display space;

(ii) code for defining an initial Selected Display Region (SDR) in the display space dependent on the initial range mapping;

(iii) code for receiving, from the pointing device, a set of coordinates in the initial SDR;

(iv) code for updating the range mapping dependent upon the received set of coordinates;

(v) code for redefining the SDR dependent upon the updated range mapping;

(vi) code for determining a presence of any GUI object within the redefined SDR;

(vii) code for selecting, if one GUI object is present in the redefined SDR, the GUT object; and (viii) code for repeating, if more than one GUI object is present in the redefined SDR, steps (iii)-(viii).

According to another aspect of the invention there is provided a computer program product including a computer readable medium having recorded thereon a computer program for directing a processor to execute a procedure for selecting a GUI object in a display space using a pointing device, the program comprising:

(a) code for receiving a coordinate position from the pointing device; and (b) code for selecting, if a directional signal is received from the pointing device, a closest GUI object in a direction dependent upon the directional signal.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
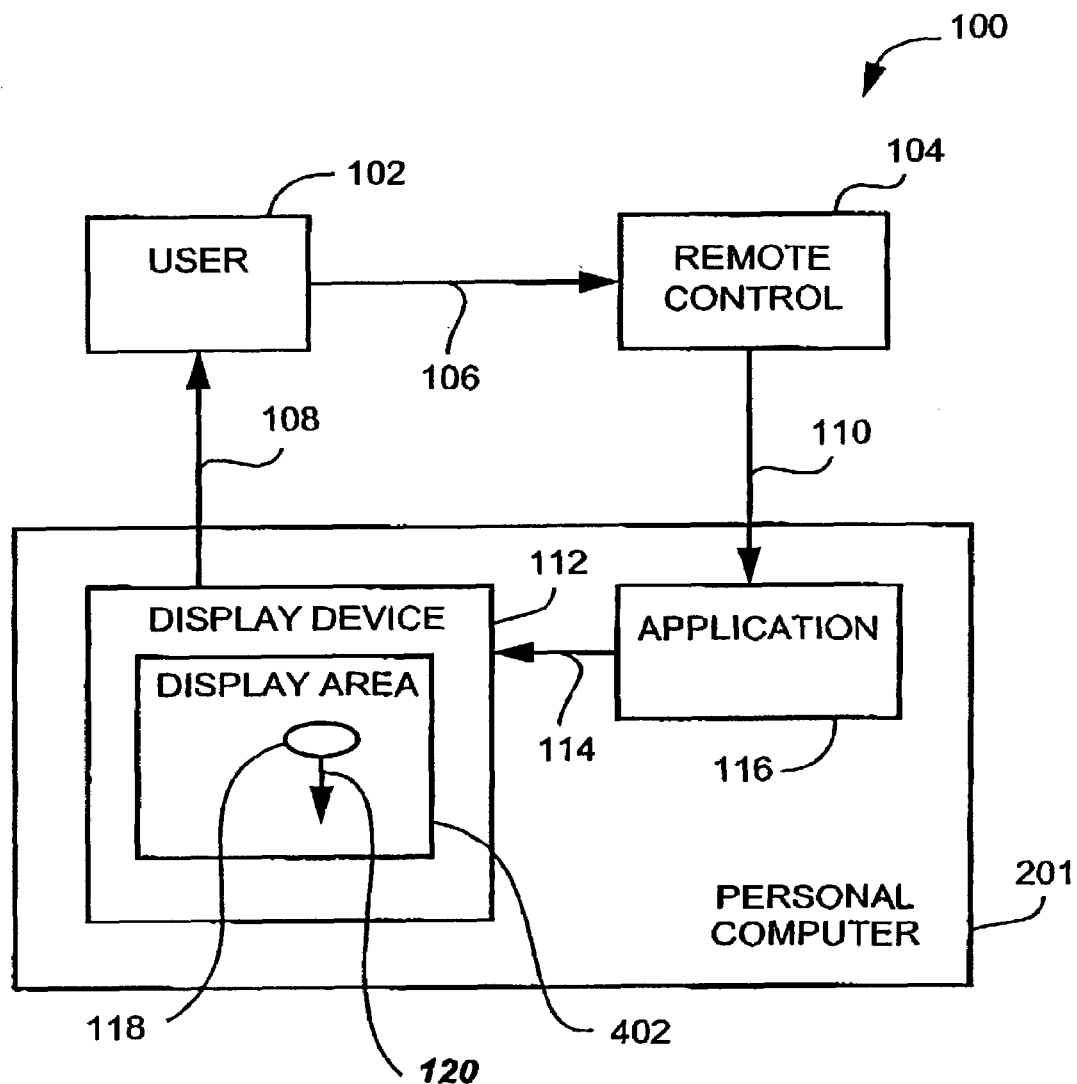
FIG. 1 shows a block diagram of a system in which a user can select a GUI object on a display screen.

Where reference is made in any one or more of the accompanying drawings to steps and/or features, which have the same reference numerals, those steps and/or features have for the purposes of this description the same function(s) or operation(s), unless the contrary intention appears.

As previously noted, it is often desirable for the user to have the capability of selecting one of a possibly large number of GUI objects that are moving dynamically on a display screen of a PC system or a TV system that has an associated PC capability.

FIG. 1 shows a block diagram of a system 100 by which a user 102 may select a GUI object 118 on a display area 402 of a display device 112. The user 102 uses a remote control device 104 in order to perform the aforementioned selection. The exemplary GUI object 118 has a direction and a velocity depicted by a vector 120. GUI objects typically represent information specific to an application 116 that is being run on a PC module 201. The exemplary remote control device 104 has an infra-red (IR) transmitter which converts user inputs 106 to corresponding commands 110 directed to the PC module 201. The exemplary remote control device 104 described in this specification is a touch pad device 410 equipped with a touch pad region 416 as well as other controls (see FIG. 3A). Other devices, however, such as joy-sticks, multi-way rocker switches, or other controls that provide positional and/or directional inputs may alternately be used.

When selected the GUI object 118 can be highlighted on the display area 402 in order to provide feedback to the user 102 that selection has been performed. The software application 116 generates the dynamic GUI objects that are displayed on the display device 112, interprets the commands 110, and sends corresponding graphical data 114 to the display device 112, thereby changing the display of the GUI objects accordingly. The graphical data 114 can highlight a GUI object that has been thus selected by the user 102, thereby providing visual feedback 108 from the display device 112 to the user 102, and providing the user 102 with confirmation that the desired GUI object has been successfully selected.

Figure 2:
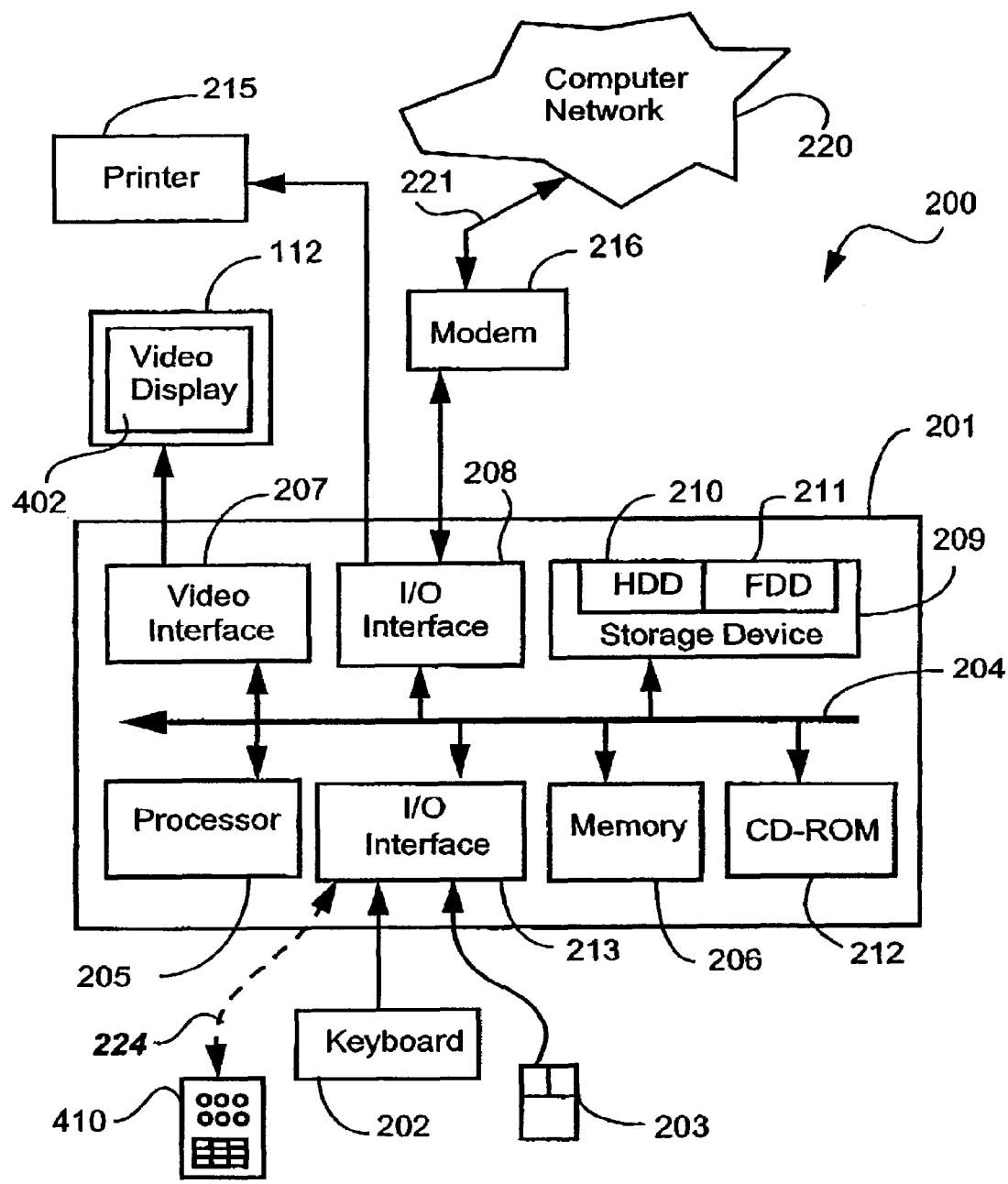
FIG. 2 is a schematic block diagram of a general-purpose computer upon which arrangements described can be practiced.

FIG. 2 illustrates how the method of selecting the GUI object is preferably practiced using a general-purpose computer system 200. In this arrangement, processes described in relation to FIGS. 4, 5, 7, 9 may be implemented as software, such as the application program 116 executing within the computer system 200. In particular, the steps of method of selecting a GUI object are effected by instructions in the software that are carried out by the computer. The instructions may be formed as one or more code modules, each for performing one or more particular tasks. The software may also be divided into two separate parts, in which a first part performs the selection of GUT object methods, and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product.

The use of the computer program product in the computer preferably effects an advantageous apparatus for selecting a desired GUI object.

The computer system 200 comprises the computer module 201, input devices such as a keyboard 202, mouse 203, and the touch pad device 410, output devices including a printer 215 and the display device 112 having the display area 402. A Modulator-Demodulator (Modem) transceiver device 216 is used by the computer module 201 for communicating to and from a communications network 220. The modem is, for example, connectable to the network 220 via a telephone line 221 or other functional medium. The modem 216 can be used to obtain access to the Internet, and other network systems, such as a Local Area Network (LAN) or a Wide Area Network (WAN).

The computer module 201 typically includes at least one processor unit 205, a memory unit 206, for example formed from semiconductor random access memory (RAM) and read only memory (ROM). The module 201 also includes input/output (I/O) interfaces, including a video interface 207, and an I/O interface 213 for the keyboard 202, the mouse 203, the touch pad device 410 by means of a wireless connection 224, and optionally a joystick (not illustrated). The module 201 also has an interface 208 for the modem 216. A storage device 209 is provided and typically includes a hard disk drive 210 and a floppy disk drive 211. A magnetic tape drive (not illustrated) may also be used. A CD-ROM drive 212 is typically provided as a non-volatile source of data The components 205 to 213 of the computer module 201, typically communicate via an interconnected bus 204 and in a manner which results in a conventional mode of operation of the computer system 200 known to those in the relevant art. Examples of computers on which the described arrangements can be practised include IBM-PC's and compatibles, Sun Sparcstations or alike computer systems evolved therefrom.

Typically, the application program 116 is resident on the hard disk drive 210 and read and controlled in its execution by the processor 205. Intermediate storage of the program and any data fetched from the network 220 may be accomplished using the semiconductor memory 206, possibly in concert with the hard disk drive 210. In some instances, the application program may be supplied to the user encoded on a CD-ROM or floppy disk and read via the corresponding drive 212 or 211, or alternatively may be read by the user from the network 220 via the modem device 216. Still further, the software can also be loaded into the computer system 200 from other computer readable media The term "computer readable medium" as used herein refers to any storage or transmission medium that participates in providing instructions and/or data to the computer system 200 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of transmission media include radio or infra-red transmission channels as well as a network connection to another computer or networked device, and the Internet or Intranets including email transmissions and information recorded on websites and the like.

The method of selecting a GUI object may alternatively be implemented in dedicated hardware such as one or more integrated circuits performing the functions or sub functions of selecting a GUI object. Such dedicated hardware may include graphic processors, digital signal processors, or one or more microprocessors and associated memories.

Two variations of the method of selecting a GUI object are described, each requiring the user 102 to use the touch pad device 410 in a slightly different manner, and for which the display device 112 operates in correspondingly different feedback modes. Preparatory to describing the aforementioned selection methods, it is convenient to describe the exemplary touch pad device 410 that is used as the remote control device 104.

Figure 3A:
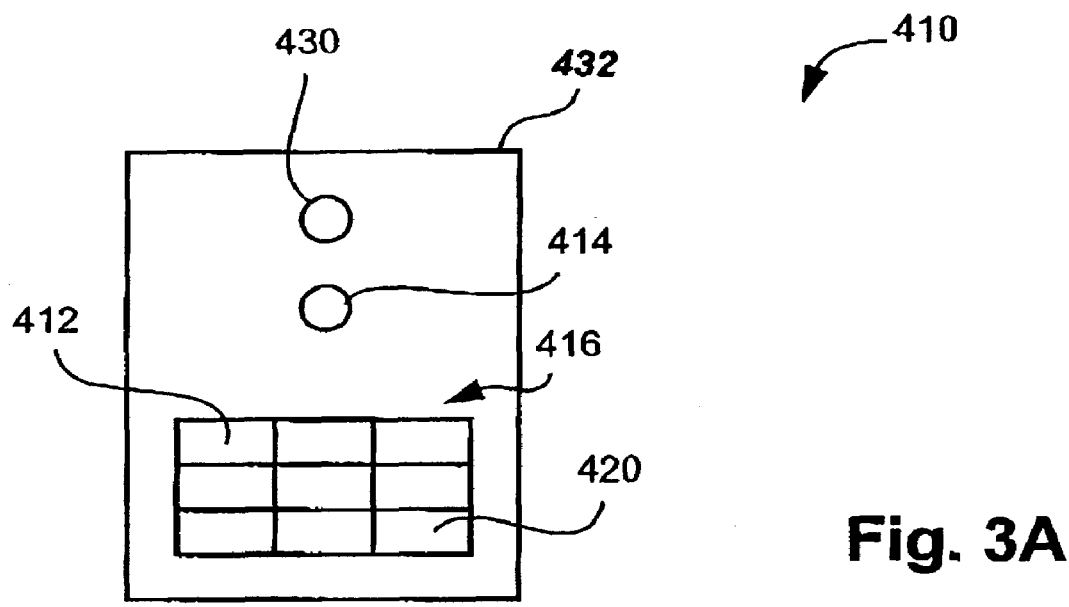
FIG. 3A shows an illustrative the touch pad device.

FIG. 3A illustrates the touch pad device 410 that is described in this specification. The touch-pad device comprises an outer casing 432 and a number of controls. It can also include a small display (not shown) that mirrors, typically at a lower resolution, the display on the display area 402 of the display device 112. In general, controls on the remote control device 104 are used for making GUI object selection, and also for other purposes that are specific to the exemplary application 116. In the present example, a touch pad region 416 serves as the control for providing positional or directional information that is used to select the desired GUI object. A MULTI-SELECT toggle button 414 serves to enable or disable multiple selections of GUI objects, and an EXIT button 430 allows the user to exit an operation in a current context.

The touch pad device 410 allows the user 102 to specify positional information in the two-dimensional display space 402, in terms of a pair of coordinates, by touching a position on the touch pad region 416 with a finger or a stylus. The touch pad region 416 also allows the user 102 to specify directional information in the two-dimensional display space 402. Directional information is specified in terms of an initial finger placement coordinate on the touch pad region 416, and an angle defined by holding the user holding their finger down and dragging their finger in a desired direction along the surface of the touch pad region 416. An imaginary line (see 908 in FIG. 8) formed between the initial finger placement position and the finger position after the dragging action is completed is used to derive an angle relative to an axis.

The MULTI_SELECT 414 button is a toggle button which has an ON or OFF state. When OFF, only one GUI object can be selected at any one time. When a GUI object is selected, any previously selected GUI objects are de-selected. When the button 414 is ON, a new selection can be made without de-selecting any previous GUI object selections. The EXIT button is used to exit an operation in the current context so that it can be cancelled or retried. Thus, for example, if the user no longer wishes to select a GUI object, or if the desired GUI object is outside a Selected Display Region (SDR), the user can use the EXIT button to revert to the state just prior to inputting the last position. This allows the user to cancel or retry the last operation. If the user wishes to make multiple selections of GUI objects, the MULTI-SELECT button has to be toggled ON before further selections are made. Otherwise, the next selection will de-select the current selection. While selecting multiple GUI objects, selecting an already selected GUI object will de-select it.

In a first arrangement, the user provides what are referred to as "positional inputs". This allows the user 102 to progressively perform selection, while maintaining the complete dynamic range of the touch pad device 410, in a smaller and smaller display region, referred to as a Selected Display Region (SDR), on the display area 402 (see FIG. 3B) of the display device 112. This process continues until the SDR contains only the desired GUI object.

Figure 3B:
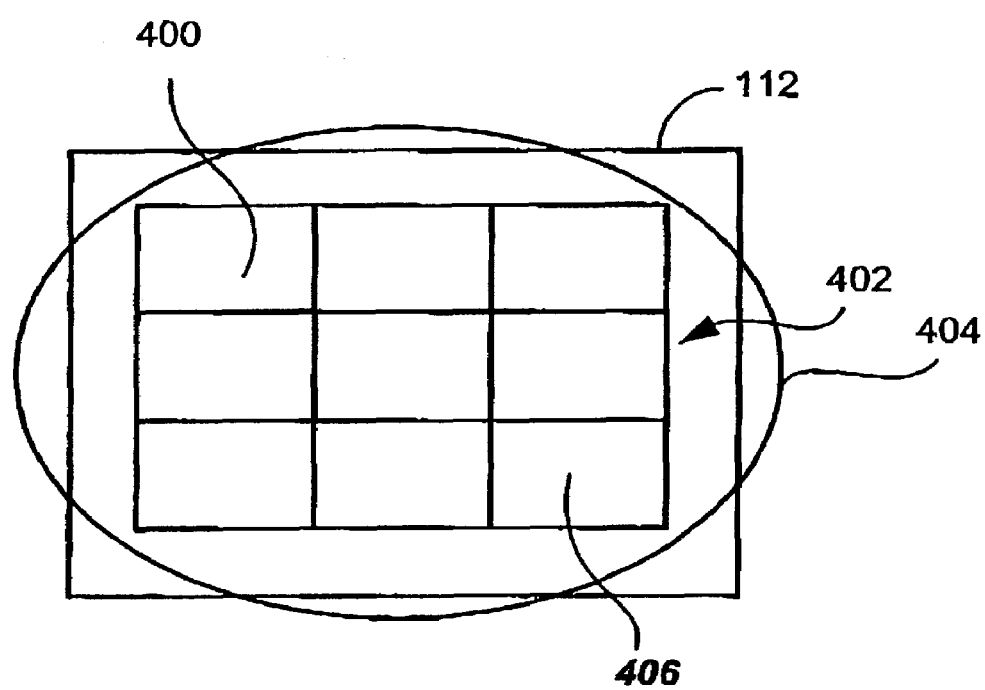
FIG. 3B shows an initial Selected Display Region (SDR)

FIG. 3B shows a first instance of the display device 112 and the display area 402, in regard to which a technique called "range mapping" between the display area 402 of the display device 112 and the touch pad region 416 of the touch pad device 410 will now be described. In the case when positional inputs are used to select a GUI object, the selection process commences by performing an initial range mapping of the touch pad region 416 of the touch pad 410 (see FIG. 3A) to the entire display area 402. This initial range mapping defines an initial SDR that encompasses the entire display area 402. The initial SDR is thus depicted by an elliptical boundary 404. The touch pad region 416 is divided into nine touch regions exemplified by touch regions 412 and 420, and in the initial range mapping, these nine touch regions map to nine corresponding display regions exemplified by display regions 400 and 406 on the display area 402. The term range mapping denotes the relationship between the display area 402, a current SDR, and the touch pad region 416, and denotes how a touch on the touch pad region 416 is interpreted by the application 116 as corresponding to a particular display region in the current SDR of the display area 402. In accordance with the initial range mapping, a user touch input to the top left hand touch region 412 of the touch pad region 416 is interpreted as corresponding to the top left hand display region 400 of the SDR 404. Similarly, an input to the bottom right hand touch region 420 of the touch pad region 416 is interpreted as corresponding to the bottom right hand display region 406 of the SDR 404.

If the user notices a desired GUI object, say in the display region 400 of the initial SDR 404, the user 102 touches a point on the touch region 412 of the touch pad region 416 that corresponds to an approximate position of the desired GUI object in the display region 400 in the current SDR 404. The touch pad device 410 then transmits a corresponding command 110 that represents the location of the touch region 412 that has been pressed by the user, to the application 116. In one arrangement, the application 116 determines whether there is a single GUI object only in the display region 400. If this is the case, the application 116 selects that single GUI object in the display region 400, and that GUI object is highlighted in the display to show the user that the GUI object has been selected. If, however, there are multiple GUI objects in the display region 400, then none of these GUI items are highlighted, and the application 116 revises the range mapping and re-maps the touch pad region 416 to just the specified display region 400, thereby specifying a new SDR 404'.

Figure 3C:
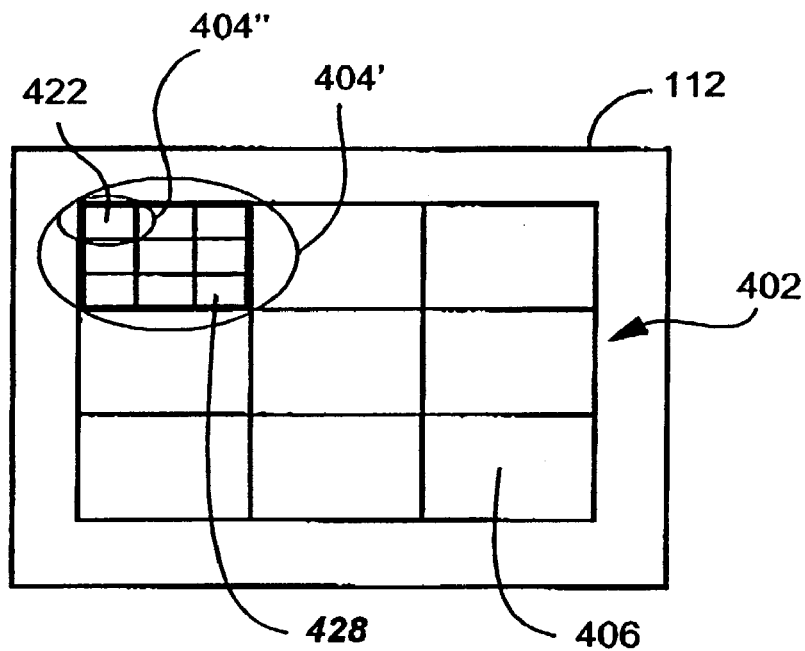
FIG. 3C shows a subsequent SDR after revised range mapping.

FIG. 3C shows a second instance of the display device 112 and the display area 402, after the aforementioned revised range mapping. As noted, the new SDR is now defined by the elliptical boundary 404', and the rectangular boundary of the display region 400 is highlighted as depicted in FIG. 3C by a bold border. The touch pad region 416 of the touch pad 410 is re-mapped by the application 116 to only the highlighted new SDR 404'. The practical effect of the aforementioned highlighting is to provide the user with immediate visual feedback as to the region of the display to which the user has pointed, and this provides a new frame of reference to the user for inputting the next position on the touch pad 410. The revised range mapping results in the fact that an input to the touch region 412 of the touch pad region 416 is now interpreted as corresponding to a display region 422 of the SDR 404'. Similarly, an input to the touch region 420 of the touch pad region 416 is interpreted as corresponding to a display region 428 of the new SDR 404'.

If the desired GUI object is seen by the user to be, say, in the display region 422 of the new SDR 404', the user 102 touches a point on the touch region 412 of the touch pad region 416 that corresponds to an approximate position of the desired GUI object in the display region 422 in the new SDR 404'. The touch pad device 410 the transmits a corresponding command 110 that represents the location of the touch region 412 that has been pressed by the user, to the application 116. In the described arrangement, the application 116 determines whether there is a single GUI object only in the display region 422. If this is the case, the application 116 selects that single GUI object in the display region 422, and that GUI object is highlighted in the display to show the user that the GUI object has been selected. If, however, there are multiple GUI objects in the display region 422, then the application 116 revises the range mapping and re-maps the touch pad region 416 to just the specified display region 422, thereby specifying yet a new SDR 404".

In the described arrangement, if there is only one GUI object in a particular display region that the user has pointed to, then that GUI object is selected and highlighted. The highlighting of the GUI object indicates to the user that he has actually selected the highlighted GUI object. If, however, there are multiple GUI objects in the display region that has been pointed to, then no GUI object is highlighted. A revised range mapping is performed, and a new SDR is thereby defined and is also highlighted. The user can again touch a point on the touch pad region 416 that corresponds, in the estimation of the user 102, to the coordinate position of the GUI object in the newly highlighted SDR. The user continues with the above process until the desired GUI object is selected.

The described arrangement highlights the SDR and the desired GUI object in the display area 402 in order to provide visual feedback cues to the user. These cues help the user track and select the GUI object. Other feedback indications can also be used. For example, indicative text messages can be provided, either on the display area 402, or on another auxiliary display (not shown).

In general, the range-mapping technique enables the touch pad region 416 of the touch pad device 410 to be mapped to an SDR comprising the entire display area 402, as well as to new SDRs encompassing any sub-section of the display region 402. Successive range mapping operations thus provide the user of the touch pad 410 with a convenient and effective method for rapidly converging on a desired GUI object displayed in the display area 402, while maintaining the full dynamic range of the touch pad region 416 over successively smaller SDRs.

It is apparent that although the arrangement in FIG. 3 deals specifically with a two-dimensional (2-D) display area 402, and a corresponding 2-D pointing device in the form of the touch pad 410, this is merely an example. Thus the aforementioned range-mapping concept can be applied to an N-dimensional display space and a corresponding N-dimensional pointing device.

A three-dimensional arrangement could be implemented, for example, using a "virtual-reality" display arrangement together with a joy stick having auxiliary controls to enable three-dimensional pointing.

Figure 3D:
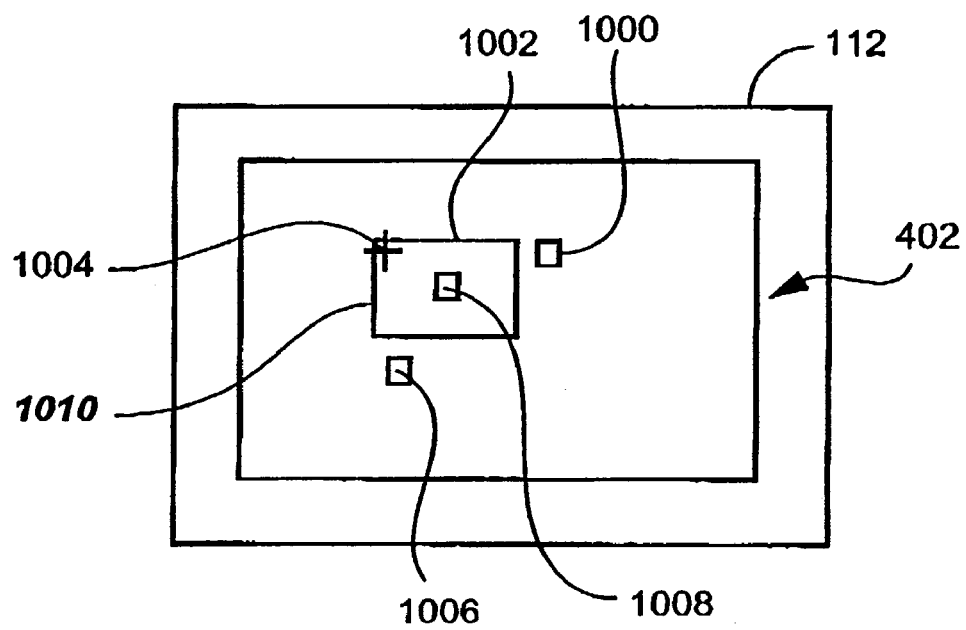
FIG. 3D shows an alternative range mapping arrangement.

FIG. 3D shows an alternative range mapping arrangement, wherein range mapping is performed on the basis of a user selected coordinate position of the desired GUI object, and the actual coordinate position of that GUI object which is closest to the user selected coordinate position, thus not relying on the 9-segment touch region as the basis for defining new SDRs. The display device 112 and the display area 402 show three displayed GUI objects 1000, 1006 and 1008. The touch pad region 416 is initially mapped to the entire display area 402, which thus forms the initial SDR. The user selects a coordinate position 1004 by touching a particular (corresponding) position of the touch pad region 416. The touch pad device 410 transmits a command 110 that represents the location of the touch region 412 that has been pressed by the user, to the application 116. The application 116 then determines which is the closest GUI object to the user selected coordinate position, which in this case is the GUI object 1008 which is closer to the user selected coordinate position 1004 than other displayed GUI objects 1000 and 1006. The application 116 then defines a new SDR 1010 having the aforementioned closest GUI object 1008 at the centre of the new SDR, and the user selected coordinate 1004 near a boundary thereof. The application 116 also revises the range mapping and re-maps the touch pad region 416 to the new SDR 1010.

Figure 4:
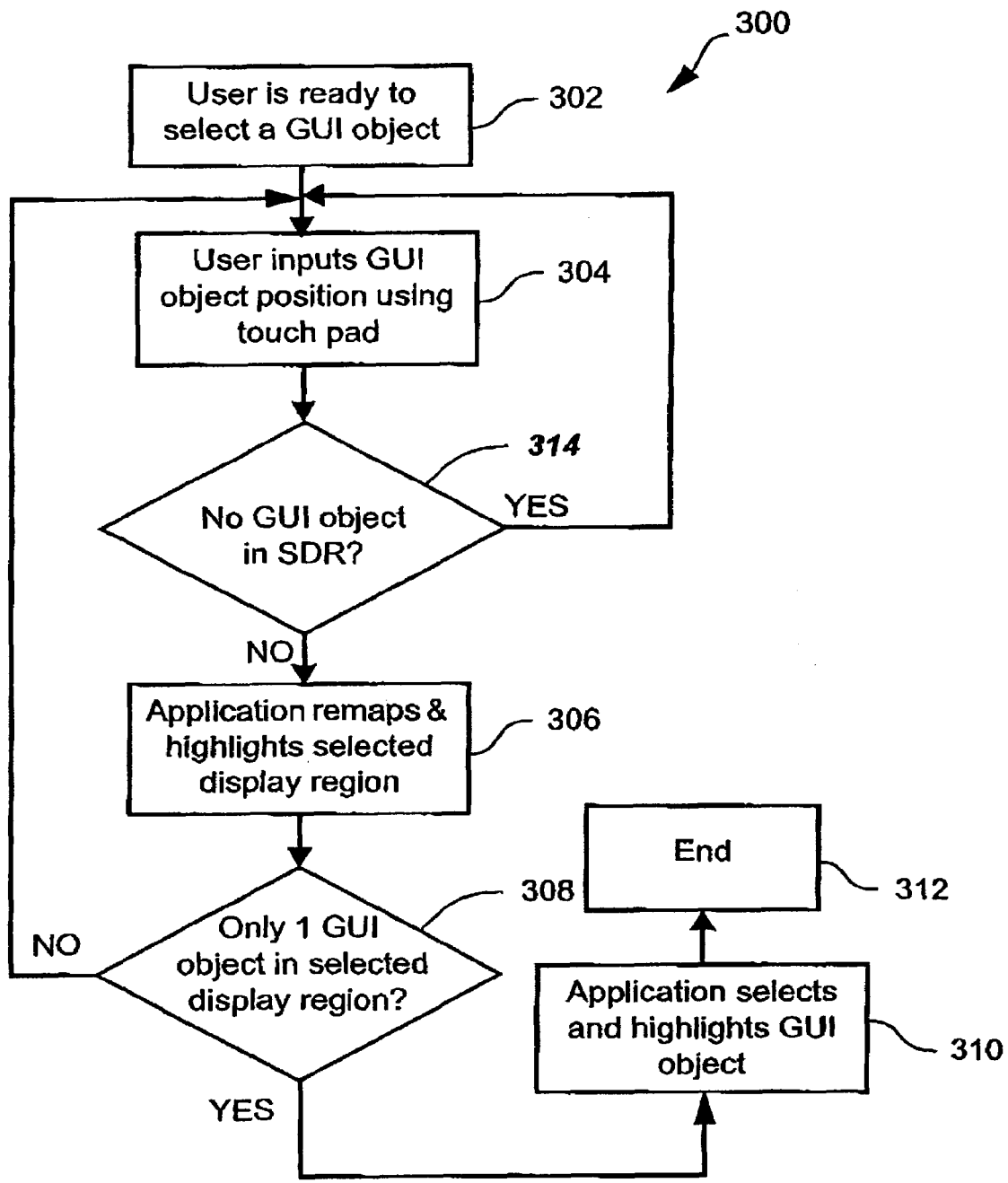
FIG. 4 shows a process whereby a user can operate the system of FIG. 1 for selecting GUI objects by providing positional inputs.

FIG. 4 shows a process 300 whereby the user 102 can operate the system of FIG. 1 for selecting the desired GUI object by providing positional inputs. The process commences at a step 302 at which stage the user 102 is ready to select the desired GUI object represented on the display area 402 of the display device 112. Thereafter, at a step 304 the user inputs an estimated coordinate position of the desired GUI object using the touch pad region 416 of the touch pad device 410. Thereafter, a testing step 314 determines whether there is a GUI object in the SDR. If there is no such object, then the process 300 is directed in accordance with a "yes" arrow back to the step 304. If, on the other hand, a GUI object is to be found in the SDR, then the process 300 is directed in accordance with a "no" arrow to a step 306, in which the application 116 highlights the perimeter of the new SDR resulting from the user input, using the range mapping process. The step 306 also remaps the touch pad region 416 of the touch pad 410 to just the highlighted new SDR. The remapping ensures that the entire dynamic range of the touch pad device 410 is applied to the new SDR, thereby providing the user 102 with a finer granularity of control within the new SDR.

In a following testing step 308 the application 116 determines whether there is only one GUI object in the SDR that has now been highlighted on the display area 402. If there is only one displayed GUI object in the SDR, then the process is directed in accordance with a "yes" arrow to a step 310 in which the application 116 selects and highlights that GUI object. The highlighting operation provides the user 102 with visual feedback 108 that he has, indeed, selected the desired GUI object. The process 300 thereafter terminates at a step 312.

Returning to the testing step 308, if there are GUI objects other than the desired GUI object in the SDR, then the process 300 is directed in accordance with a "no" arrow to the step 304 where the user provides another positional input to the touch pad device 410.

Figure 5:
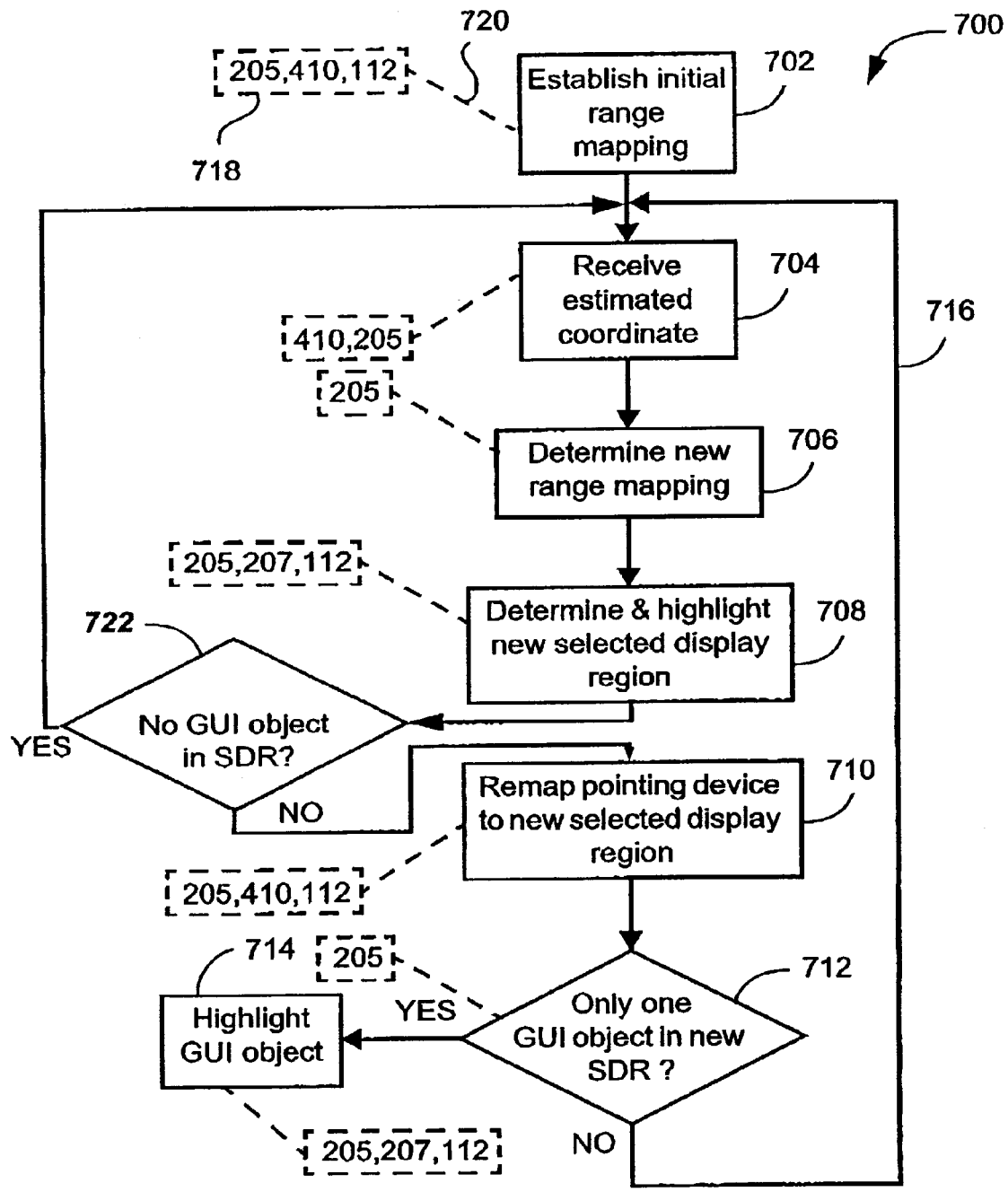
FIG. 5 depicts a system process flow chart of method steps by which the software application in FIG. 1 selects the GUI object using positional inputs.

FIG. 5 shows depicts a system process flow chart of method steps by which the application 116 of FIG. 1 selects the desired GUI object using the positional inputs. The process 700 commences with a step 702 which establishes an (initial) range mapping between the display area 402 of the display device 112 and the selectable range of the touch pad device 410. The process 700 is then directed to a step 704 that receives estimated coordinate information, referred to the display area 402, for the desired GUI object. Thereafter, a step 706 determines a new range mapping between the display area 402 and the selectable range of the touch pad device 410. Thereafter, the step 708 determines a new SDR based upon the new range mapping, and the step 708 also highlights the new SDR to provide a visual feedback indication. Thereafter, a testing step 722 determines if a GUI object is to be found in the SDR. If no GUI object is to be found, then the process 700 is directed in accordance with a "yes" arrow back to the step 704. If, on the other hand, a GUI object is to be found in the SDR, then the process 700 is directed in accordance with a "no" arrow to a subsequent step 710 which remaps the touch pad region 416 of the touch pad 410 to just the aforementioned highlighted SDR.

Thereafter, the testing step 712 ascertains whether objects other than the desired GUI object are present in the highlighted current SDR. If no other objects are detected, then the process 700 is directed in accordance with "yes" arrow to a step 714 which highlights the representation of the GUI object, at which point the process 700 terminates. If, on the other hand, other objects are detected in the step 712, then the process 700 is directed in accordance with a "no" arrow to the step 704 which receives a (new) set of estimated coordinates for the desired GUI object.

The steps 704-712 are repeated until a single object is present in the current SDR, at which point the process 700 is directed in accordance with the "yes" arrow to the step 714 which highlights the desired GUI object and terminates the process.

The step 702 can be implemented, in one arrangement indicated by reference numerals contained in a dashed box 718 connected by a dashed line 720 to the step 702 in question, by the processor 205, in conjunction with the touch pad device 410 and the display device 112, as can the step 710. Similarly, the step 704 can be implemented by the touch pad device 410, in conjunction with the processor 205. Similarly, the steps 706 and 712 can be implemented by the processor 205. Similarly, the steps 708 and 714 can be implemented by the processor 205, in conjunction with the video interface 207 and the display device 112.

As the user 102 directs her attention to successively smaller SDRs 404, 404', 404", . . . , the user must direct her attention to successively smaller segments of the display area 402 and visual resolution decreases. The SDR can however be enlarged on the display to show each SDR in magnified form, preferably using the entire display area 402. This displays GUI objects in greater detail.

Figure 6:
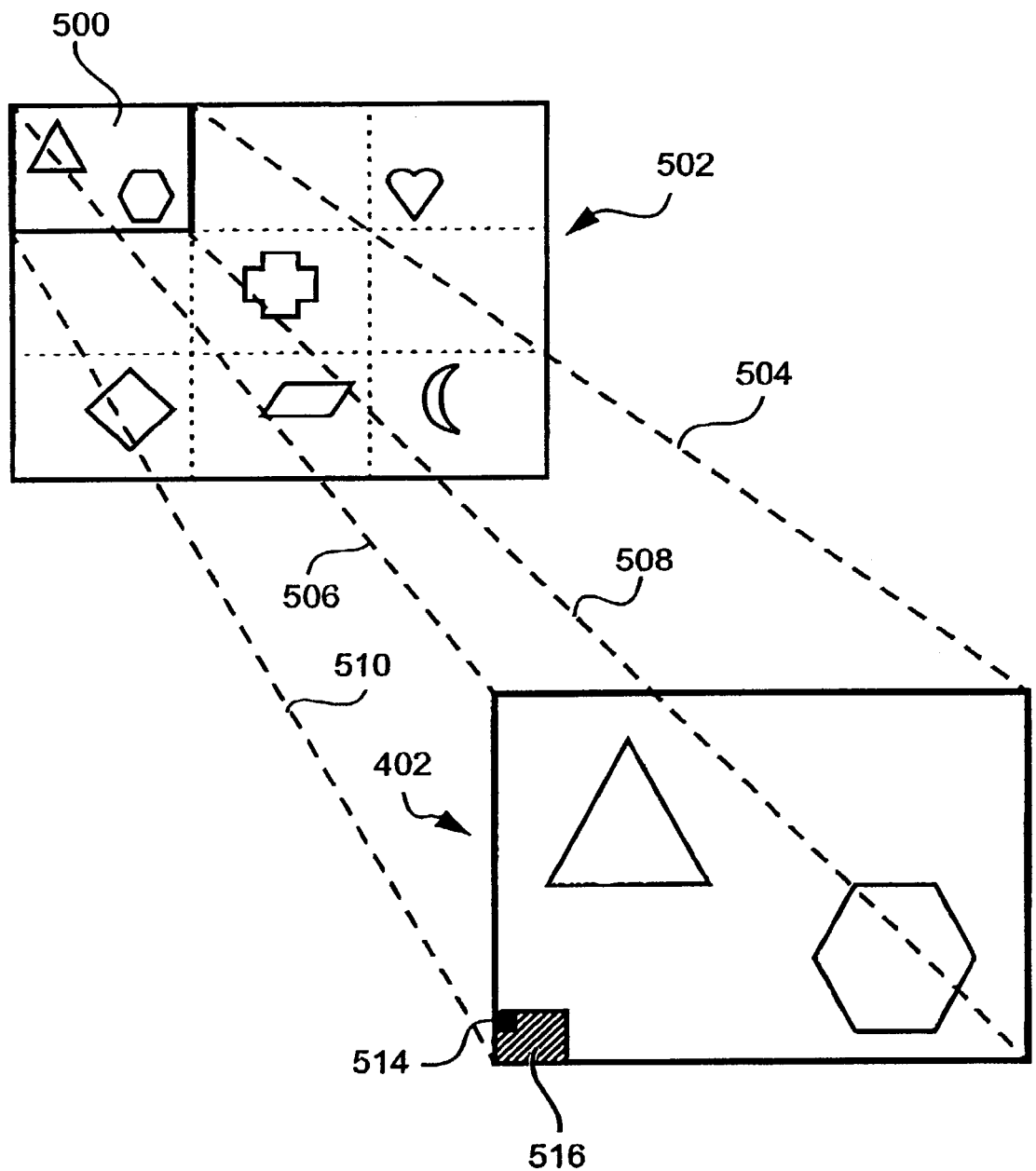
FIG. 6 depicts selective magnification of the Selected Display Region (SDR) on PC display screen.

FIG. 6 shows this aforementioned arrangement whereby as the attention of the user 102 is directed from a current SDR 502 to a new SDR 500, the new SDR 500 is magnified and mapped to the entire display area 402 as depicted by dashed lines 504, 508, 506 and 510. This provides the user 102 with a magnified view of contents of the new SDR 500 as shown. In order to provide the user with a frame of reference as to where the magnified new SDR 500 lies in regard to the overall display area 402, a reduced representation of both the overall display area 402 and the new SDR 500 (called a "picture-in-picture view") can be shown, at 516 and 514. This picture-in-picture view can be intelligently placed at one of the corners of the display area 402 to avoiding obstructing any of the GUI objects.

Having described selection of GUI objects using positional information, we turn to a second arrangement in which the user 102 can select a GUI object using Directional Inputs. In this arrangement, the touch pad region 416 of the touch pad device 410 is mapped to the entire display area 402 (see FIG. 3B). When the user observes the display 402 and notices a desired GUI object, he touches an initial position on the touch pad region 416 that corresponds to the perceived position of the desired GUI object on the display 402, and holds his finger down on the touch pad region 416 at the initially selected position. The touch pad device 410 transmits the coordinates of the touched position to the application 116. The application determines which is the nearest GUI object to the specified position and marks that GUI object in the memory 206 as a "targeted" GUI object. This currently targeted GUI object is highlighted in the display 402 to provide the user 102 with visual feedback of which GUI object has been targeted. If the targeted GUI object is not the desired GUI object, the user uses the touch pad device 410 to indicate a direction to the desired GUI object by dragging his finger in the direction of that desired GUI object relative to the currently targeted and highlighted GUI object. The touch pad device 410 transmits the specified direction to the application 116 that then selects and highlights the GUI object that is nearest to the currently targeted GUI object in the specified direction. If that newly highlighted GUI object is the desired one, the user then lifts his finger off the touch pad to finalise the selection thereof.

Figure 7:
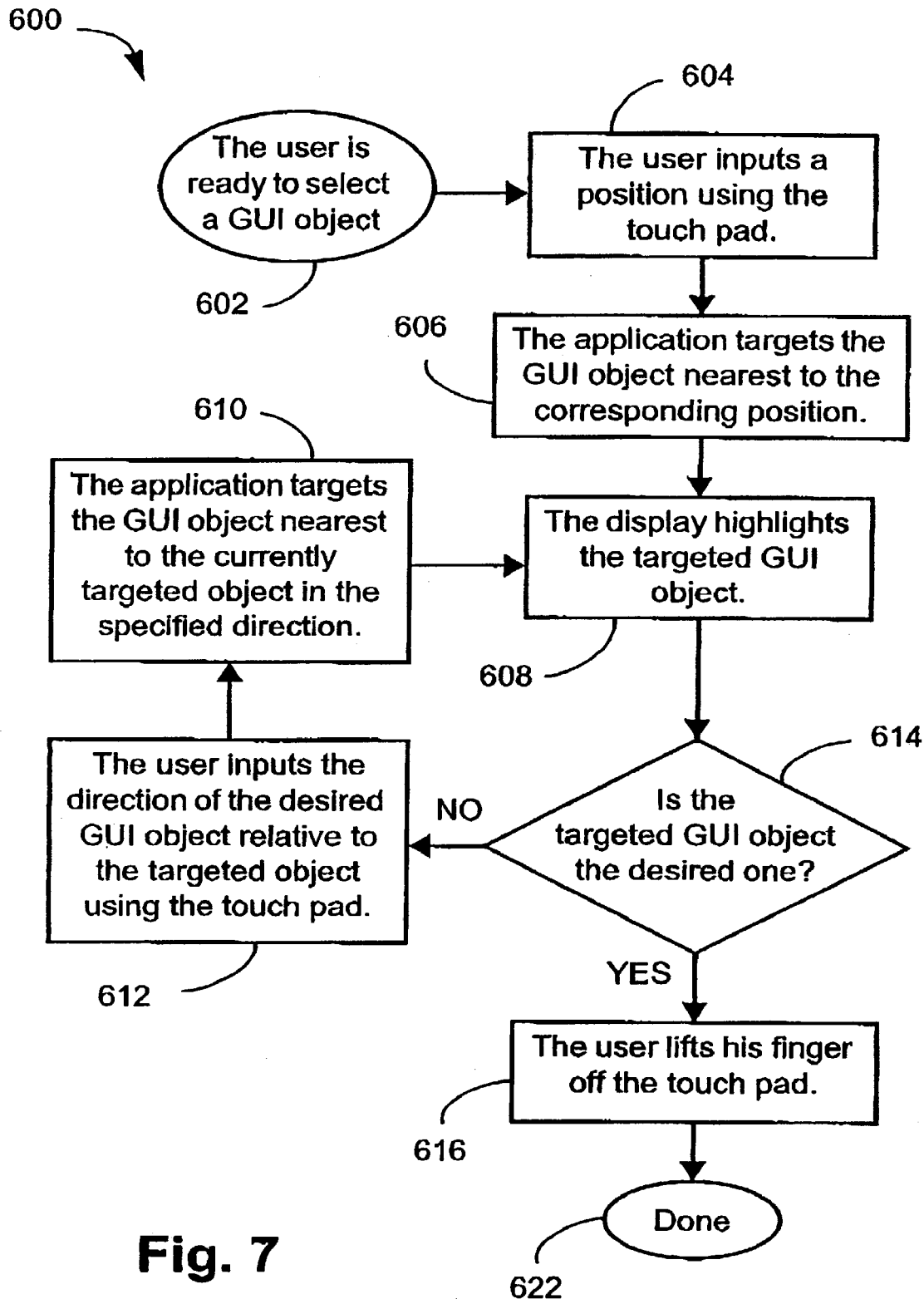
FIG. 7 shows a process whereby a user can operate the system of FIG. 1 for selecting objects by providing directional inputs.

FIG. 7 shows a process 600 for this arrangement whereby the user 102 can select a GUI object using directional input information. The process 600 commences at a step 602, at which juncture the user 102 is ready to select the desired GUI object. Thereafter, a step 604 receives an (initial) set of estimated coordinates for the desired GUI object from the user 102 who is using the touch pad device 410. Thereafter, at a step 606 the GUI object nearest to the aforementioned estimated coordinate position is identified, and in a following step 608, the identified GUI object is targeted and highlighted, thereby indicating to the user 102 which object has been designated.

In a following step 614, the user determines whether the targeted (highlighted) GUI object is, indeed, the desired object. If this is the case, then the process 600 is s directed in accordance with a "yes" arrow to a step 616. At that point, the user 102 releases control of the touch pad 410, finalising the selection of the desired GUI object, and the process 600 then terminates at a step 622.

Returning to the testing step 614, if the highlighted GUI object is seen by the user 102 not to be the desired GUI object, then the process 600 is directed in accordance with a "no" arrow to a step 612. The user has up to this point kept his or her finger on the touch pad region 416. The user maintains his finger in contact with the touch pad region 416 and "drags" his finger in the direction of the desired GUI object. In a subsequent step 610 the application 116 identified a GUI object that is "nearest" to the currently identified GUI object in the specified direction. This is described in more detail in regard to FIG. 8. The process 600 is then directed back to the step 608 which highlights the newly identified GUI object.

The process 600 cycles through the steps 608, 614, 612 and 610, effectively pursuing the desired GUI object under the guidance of directional inputs provided by the user.

Figure 8:
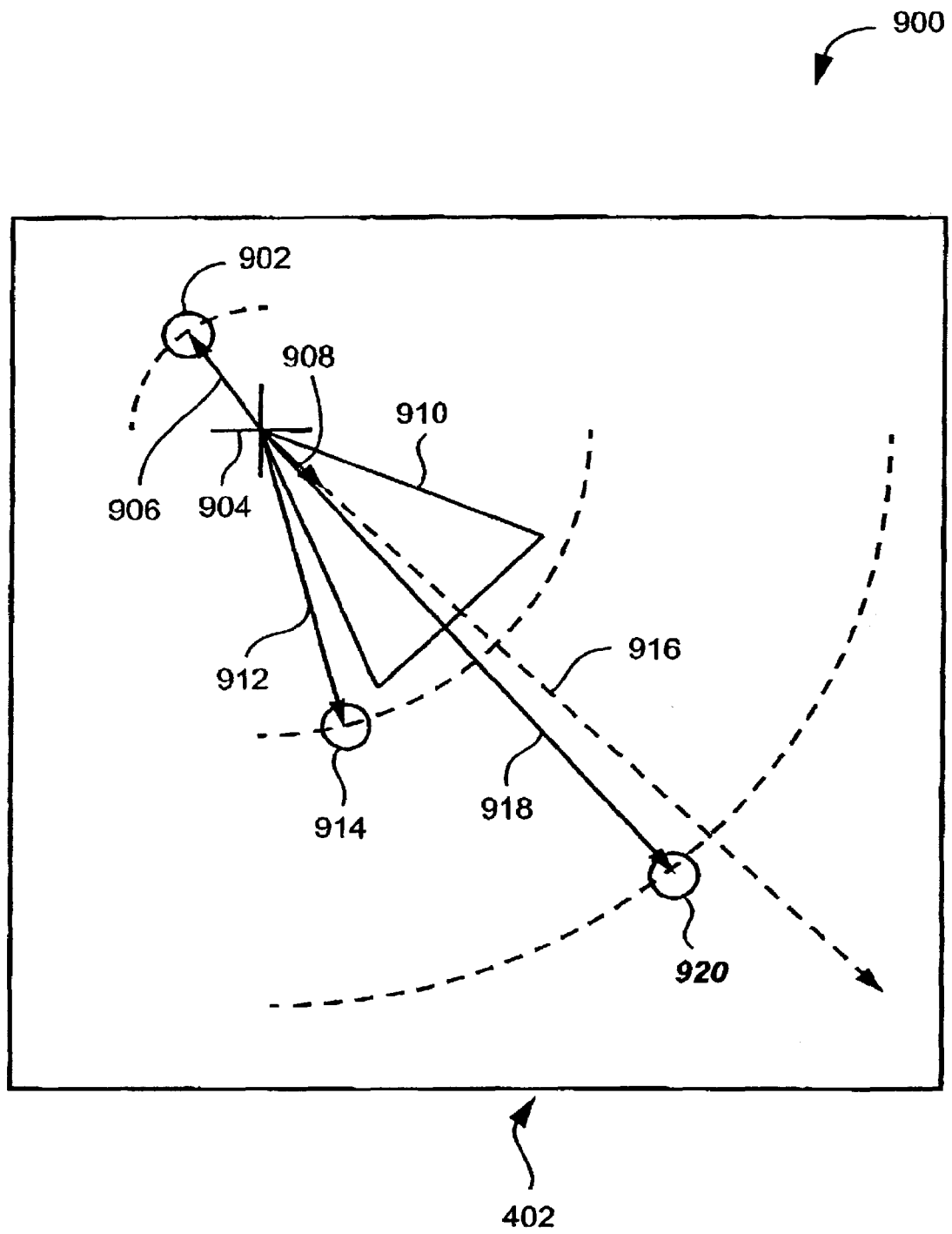
FIG. 8 illustrates one arrangement for mathematically defining a closest object in the specified direction.

FIG. 8 shows one arrangement 900 by which directional inputs provided by the user 102 can be used in order to select a GUI object which is nearest to the currently identified GUI object, in the direction specified by the user. In FIG. 8, an object 920 is the desired GUI object, however the user 102 has, by touching the touch pad region 416, indicated a location on the display area 402 corresponding to that of a cursor 904 as shown. Having regard to the object 920, and to other objects 914 and 902, the cursor 904 is closest to the object 902 as depicted by an arrow 906, and accordingly the object 902 is highlighted by the application 116. The user 102 receives the visual feedback 108 by virtue of this highlighting, and drags his finger along the touch pad region 416 thereby establishing a direction vector 908 originating from the cursor 904. While the user is dragging his or her finger along the touch pad, or, for that matter while the user's finger is stationary upon the touch pad, noise can be generated by slight unintentional movements of the user's finger. Such noise can potentially have the undersirable effect of causing a different GUI object to be highlighted, rather than the desired GUI object. Noise filtering can, however, easily be applied when the present arrangement is implemented, thereby overcoming this problem. Thus, for example, any dragging movement whose magnitude falls below a certain threshold can be ignored. The direction vector 908 points along a dashed line 916 that is shown for convenience. The object 914 is closer to the cursor 904 than is the object 920, as shown by arrows 912 and 918 respectively. However, the object 914 falls outside the triangle 910 that establishes a maximum angular deviation about the line 916 into which GUI objects must fall in order to be selected. Accordingly, the GUI object 920 is deemed to be the closest GUI object to the cursor 904 because the GUI object 920 falls within the maximum angular deviation established by the triangle 910. Accordingly, the GUI object 920 is highlighted, and this information is fed back visually to the user 102.

Figure 9:
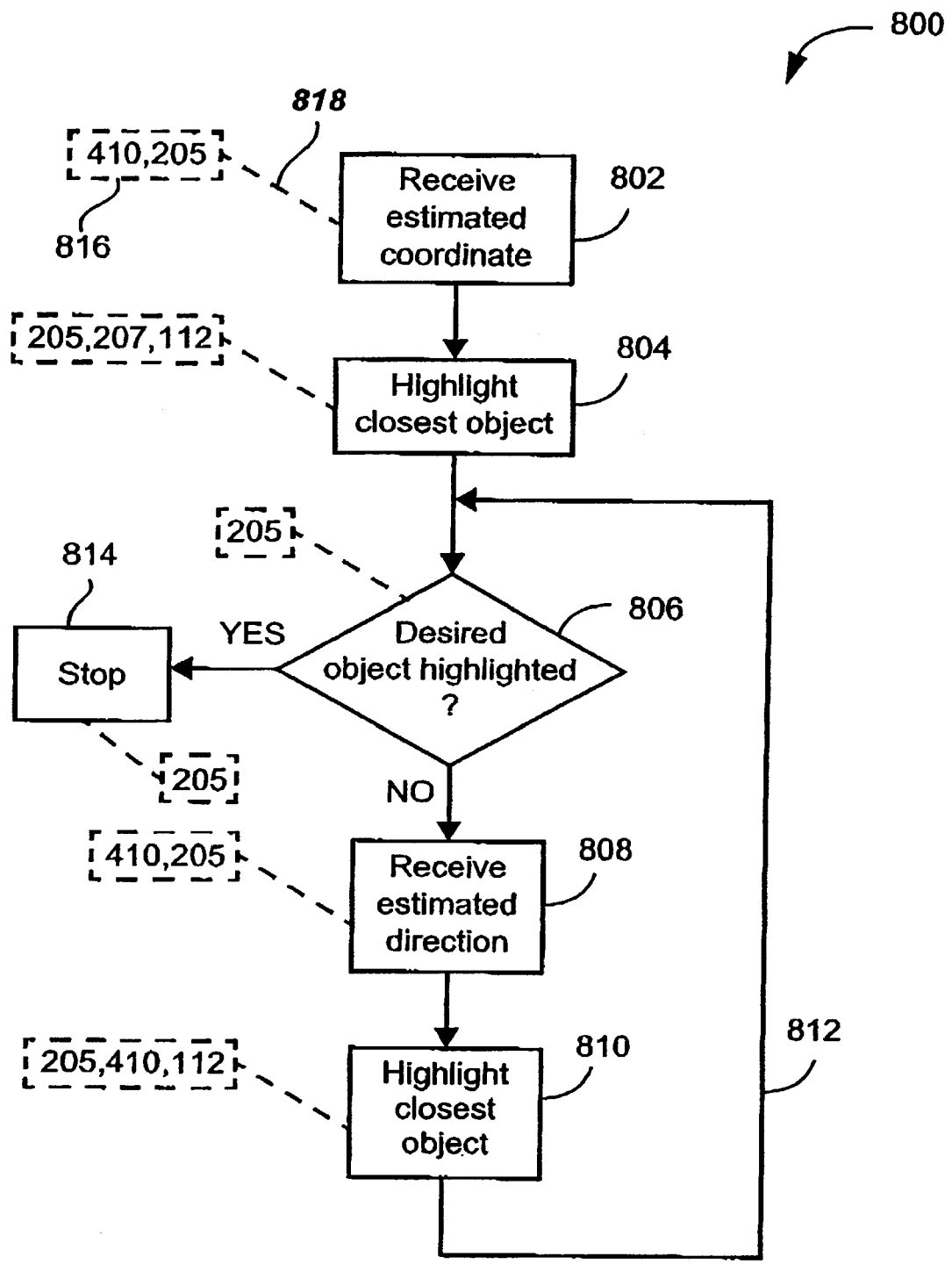
FIG. 9 depicts a system process flow chart of method steps by which the application of FIG. 1 selects the GUI object using directional inputs.

FIG. 9 shows a system process 800 of method steps by which the application 116 running on the PC system 200 selects a GUI object on the display device 112 using directional input information from the user 102. The process 102 commences at a step 802 that receives an estimated coordinate position of the desired GUI object. Thereafter, a step 804 highlights a GUI object on the display device 112 that is closest to the aforementioned estimated coordinate position. A subsequent testing step 806 establishes whether the highlighted GUI object is, indeed, the desired GUI object. If this is the case, then the process 800 is directed in accordance with a "yes" arrow to a step 814 at which point the process 800 terminates. If, on the other hand, the highlighted object is not the desired object, then the process 800 is directed in accordance with a "no" arrow to a step 808 which receives a directional input that points towards the desired GUI object. The process 800 is then directed to a step 810 which highlights the "closest" GUI object, having regard to the aforementioned directional input. The process 800 is then directed in accordance with an arrow 812 back to the testing step 806.

The step 802 can be implemented, in one arrangement indicated by reference numerals contained in a dashed box 816 connected by a dashed line 818 to the step 802 in question, by the processor 205, in conjunction with the touch pad device 410, as can the step 808. Similarly, the step 804 can be implemented by the processor 205, in conjunction with the video interface 207 and the display device 112. Similarly, the steps 806 and 814 can be implemented by the processor 205. Similarly, the step 808 can be implemented by the touch pad device 410, in conjunction with the processor 205.

INDUSTRIAL APPLICABILITY

It is apparent from the above that the arrangements described are applicable to the image processing industry.

The foregoing describes only some embodiments of the present invention, and modifications and/or changes can be made thereto without departing from the scope and spirit of the invention, the embodiments being illustrative and not restrictive.

There may be variations of the method depending on the type of control devices available and the user's preference or level of coordination. Thus, although the use of a touch pad device 410 is considered in the detailed description, other controls which provides positional and/or direction input can also be adopted. For example, a joystick or a multi-way rocker switch can be used instead for the positional input arrangement. For a joystick, one of the nine regions can be selected by moving the joystick to one of the nine positions and then pressing a joystick button. For a multi-way rocker switch, one of the nine regions can be selected by pressing the switch in one of the eight positions or the centre position.

Furthermore, if the remote control device is equipped with a mini-touch screen, a low-resolution image can be displayed on it to provide the user with better precision when inputting a position.

Furthermore, while the user is making a selection, the GUI objects are typically still moving in real-time, driven by the application 116. In order for the user to complete a selection, all the GUI objects in the SDR can be temporarily frozen until a GUI object selection is made.

The invention claimed is:

1. A method of selecting a graphical user interface (GUI) object from a plurality of distinct GUI objects, all of which are initially displayed in a display space using a user controlled pointing device, the method comprising the steps of:
- (0) defining at least two GUI objects, which are each movable within the display space, as the plurality of GUI objects;
- (i) establishing an initial range mapping between the pointing device and the display space;
- (ii) defining a selected display region (SDR) in the display space dependent on the initial range mapping;
- (iii) receiving, from the pointing device, a set of coordinates in the initial SDR;
- (iv) updating the range mapping dependent upon the received set of coordinates;
- (v) redefining the SDR dependent upon the updated range mapping;
- (vi) determining if one or more initially-displayed GUI objects are displayed within the redefined SDR;
- (vii) if only one of the initially-displayed GUI objects is displayed in the redefined SDR, selecting that GUI object in the redefined SDR and indicating said selection; and
- (viii) if more than one of the initially-displayed GUI objects is displayed in the redefined SDR, repeating at least some of the steps (iii)-(viii) until the step (vii) is performed, wherein said steps (0)-(viii) are performed in the order listed.

2. A method according to claim 1, wherein step (vii) comprises an additional sub-step of providing a feedback signal to thereby identify the selected GUI object; and said method comprises a further step of:
- (ix) if no GUI objects are present in the redefined SDR, repeating at least some of steps (i) to (ix).

3. A method according to claim 1, wherein step (v) comprises an additional sub-step of providing a feedback signal to identify the redefined SDR.

4. A method according to claim 1, wherein step (iii) comprises an initial sub-step of:
freezing motion of GUI objects in the display space until a coordinate position is received from the pointing device.

5. A method according to claim 1, wherein the SDR is displayed in a magnified format in the display space.

6. A method according to claim 1, wherein the display space is multi-dimensional.

7. A method according to claim 6, wherein:
the display space is two-dimensional; and
the pointing device is a touch pad.

8. An apparatus for selecting a graphical user interface (GUI) object from a plurality of distinct GUI objects, all of which are initially displayed in a display space, using a user controlled pointing device, the apparatus comprising:
- (0) means for defining at least two persistent GUI objects as the plurality of GUI objects;
- (i) means for establishing an initial range mapping between the pointing device and the display space;
- (ii) means for defining a selected display region (SDR) in the display space dependent on the initial range mapping;
- (iii) means for receiving, from the pointing device, a set of coordinates in the SDR;
- (iv) means for updating the range mapping dependent upon the received set of coordinates;
- (v) means for redefining the SDR dependent upon the updated range mapping;
- (vi) means for determining if one or more initially-displayed GUI objects are displayed within the redefined SDR;
- (vii) means for selecting, if only one of the initially-displayed GUI objects is displayed in the redefined SDR, selecting that GUI object in the redefined SDR and indicating said selection; and
- (viii) means for repeating, if more than one of the initially-displayed GUI objects is displayed in the redefined SDR, processing performed by at least some of said means (iii)-(viii) until the processing performed by said means (vii) is performed, wherein the processing of said means (0)-(viii) is performed in the order listed.

9. A computer-readable storage medium storing, in executable form, a computer program for directing a processor to execute a procedure for selecting a graphical user interface (GUI) object from a plurality of distinct GUI objects, all of which are initially displayed in a display space, using a user controlled pointing device, the program comprising:
- (0) code for defining at least two persistent GUI objects as the plurality of GUI objects;
- (i) code for establishing an initial range mapping between the pointing device and the display space;
- (ii) code for defining a selected display region (SDR) in the display space dependent on the initial range mapping;
- (iii) code for receiving, from the pointing device, a set of coordinates in the SDR;
- (iv) code for updating the range mapping dependent upon the received set of coordinates;
- (v) code for redefining the SDR dependent upon the updated range mapping;
- (vi) code for determining if one or more initially-displayed GUI objects are displayed within the redefined SDR;
- (vii) code for selecting, if only one of the initially-displayed GUI objects is displayed in the redefined SDR, that GUI object in the redefined SDR and indicating said selection; and
- (viii) code for repeating, if more than one of the initially-displayed GUI objects is displayed in the redefined SDR, execution of at least some of said code (iii)-(viii) until said code (vii) is performed, wherein said code (0)-(viii) is executed in the order listed.

10. A method according to claim 1, wherein the GUI objects can move relative to each other within the display space.

11. An apparatus according to claim 8, wherein the GUI objects can move relative to each other within the display space.

12. A computer-readable storage medium according to claim 9, wherein the GUI objects can move relative to each other within the display space.

13. A method of selecting a graphical user interface (GUI) object from a plurality of predetermined GUI objects, using a user controlled pointing device, the method comprising the computer-implemented steps of:
- (0) defining at least two persistent GUI objects as the plurality of GUI objects;

(i) displaying the plurality of predetermined GUI objects, at least some of which are moving, in the display space;
(ii) establishing an initial range mapping between the pointing device and the display space;
(iii) defining a selected display region (SDR) in the display space dependent on the initial range mapping;
(iv) receiving, from the pointing device, a set of coordinates in the initial SDR;
(v) updating the range mapping dependent upon the received set of coordinates;
(vi) redefining the SDR dependent upon the updated range mapping;
(vii) determining if one or more of the GUI objects displayed by said displaying step are displayed within the redefined SDR:
(viii) if only one of the GUI objects displayed in said displaying step is displayed in the redefined SDR, selecting that GUI object in the redefined SDR and indicating said selection; and
(ix) if and only if more than one of the GUI objects displayed by said displaying step is displayed in the redefined SDR, repeating at least some of the steps (iv)-(ix) until step (ix) is performed,
wherein the steps (0)-(ix) are performed in the order listed.

* * * * *